United States Patent
Masuda

(10) Patent No.: US 6,880,337 B2
(45) Date of Patent: Apr. 19, 2005

(54) CONTROL DEVICE FOR TURBOCHARGER WITH ELECTRIC MOTOR AND CONTROL METHOD OF SAME

(75) Inventor: Kei Masuda, Suntou-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/705,462

(22) Filed: Nov. 12, 2003

(65) Prior Publication Data

US 2004/0093867 A1 May 20, 2004

(30) Foreign Application Priority Data

Nov. 20, 2002 (JP) ....................................... 2002-336849

(51) Int. Cl.$^7$ .............................................. F02B 33/44
(52) U.S. Cl. .............................. 60/608; 60/607; 60/597
(58) Field of Search ........................... 60/608, 607, 597

(56) References Cited

U.S. PATENT DOCUMENTS

| | | | | |
|---|---|---|---|---|
| 4,850,193 A | * | 7/1989 | Kawamura | 60/608 |
| 4,878,347 A | * | 11/1989 | Kawamura | 60/608 |
| 4,882,905 A | * | 11/1989 | Kawamura | 60/608 |
| 4,894,991 A | * | 1/1990 | Kawamura | 60/608 |
| 4,901,530 A | * | 2/1990 | Kawamura | 60/608 |
| 4,902,956 A | | 2/1990 | Sloan | |
| 5,088,286 A | * | 2/1992 | Muraji | 60/608 |
| 5,751,137 A | * | 5/1998 | Kiuchi et al. | 60/608 |
| 5,906,098 A | | 5/1999 | Woollenweber et al. | 60/608 |
| 6,205,787 B1 | | 3/2001 | Woollenweber et al. | 60/612 |
| 6,705,084 B1 | * | 3/2004 | Allen et al. | 60/608 |

FOREIGN PATENT DOCUMENTS

| | | | |
|---|---|---|---|
| DE | 199 41 513 A 1 | 3/2001 | |
| EP | 0 294 985 A1 | 12/1988 | 60/608 |
| EP | 0 420 704 A1 | 4/1991 | 60/608 |
| JP | 03202630 A | * 9/1991 | 60/608 |
| JP | A 4-164132 | 6/1992 | 60/608 |

* cited by examiner

Primary Examiner—Thai-Ba Trieu
(74) Attorney, Agent, or Firm—Oliff & Berridge, PLC

(57) ABSTRACT

A control device for a turbocharger with an electric motor includes a turbocharger which is provided along with an internal combustion engine and supercharges air taken in the internal combustion engine using a compressor; an electric motor which can increase a supercharging pressure by running the compressor of the turbocharger; and a controller. The controller calculates a base amount of electric power to be supplied to the electric motor based on a target supercharging pressure and an actual supercharging pressure, decides an amount of electric power to be supplied to the electric motor, controls the electric motor based on the decided amount of electric power to be supplied, and sets the amount of electric power to be supplied to a maximum amount of electric power regardless of the calculated base amount of electric power when high supercharging responsiveness by the turbocharger is required.

28 Claims, 3 Drawing Sheets

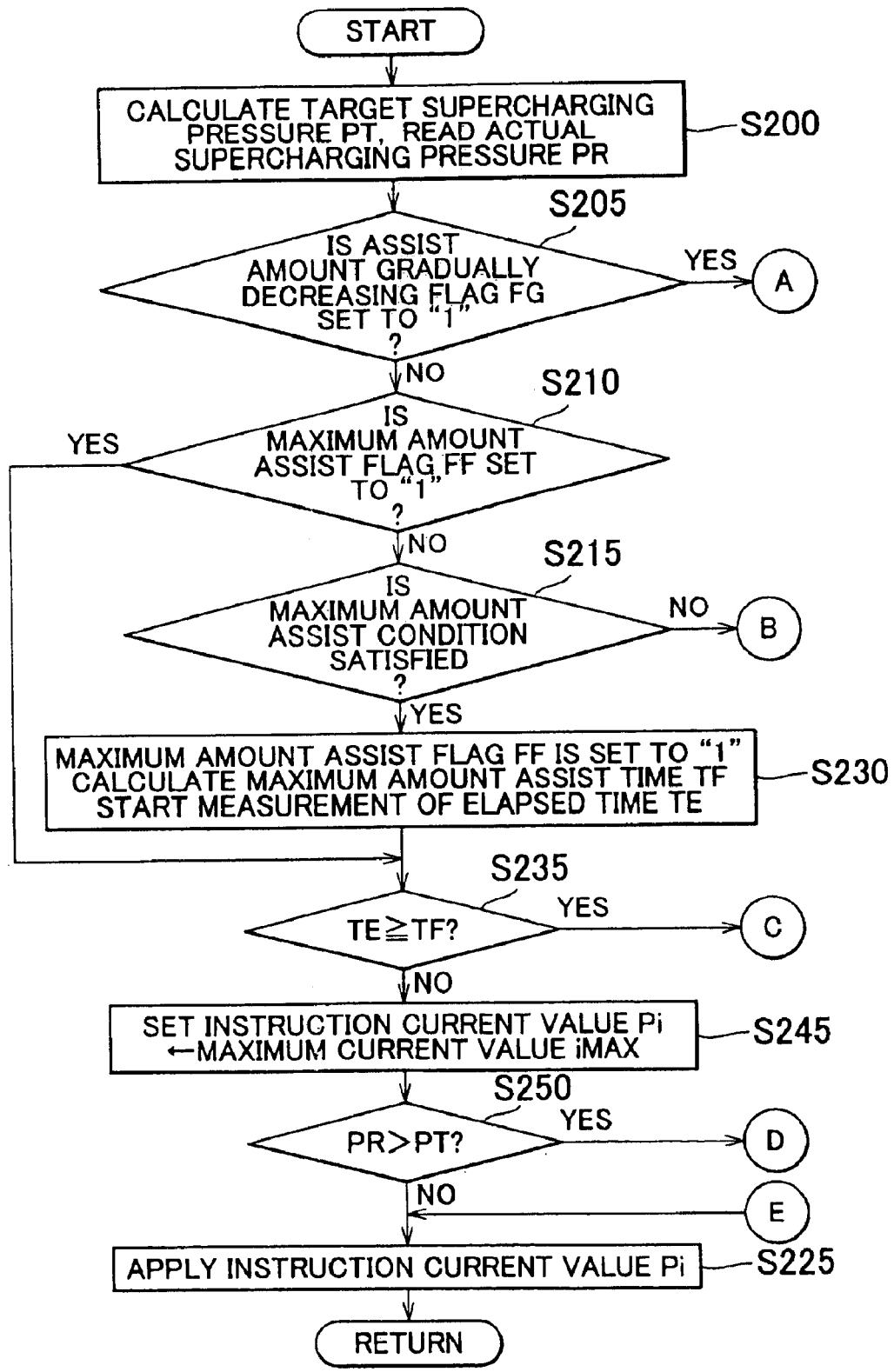

CONTROL DEVICE FOR TURBOCHARGER WITH ELECTRIC MOTOR AND CONTROL METHOD OF SAME

INCORPORATION BY REFERENCE

The disclosure of Japanese Patent Application No. 2002-336849 filed on Nov. 20, 2002 including the specification, drawings and abstract is incorporated herein by reference in its entirety.

BACKGROUND OF THE INVENTION

1. Field of the Invention

The invention relates to a control device for a turbocharger with an electric motor, in which a compressor of the turbocharger can be driven by the electric motor, and a control method of same.

2. Description of the Related Art

An attempt has been made in order to obtain high-power (or high fuel efficiency) by supercharging air taken in an engine (i.e., internal combustion engine) using a turbocharger. It has been required that some improvements be made to the turbocharger. For example, a supercharging pressure rises slowly in a low rotational region, and an engine output characteristic is not good in the low rotational region. These problems occur in the low rotational region where an amount of exhaust energy is small, due to a configuration of the turbocharger in which the intake air is supercharged using the exhaust energy. In order to address these problems, twin turbo system is generally adopted. Meanwhile, an attempt is made in order to obtain a required supercharging pressure by embedding an electric motor (i.e., a motor) in a turbine/compressor and driving the turbine/compressor forcibly. In this case, it is possible to make the electric motor perform regenerative power generation using the exhaust energy. An example of such a turbocharger with an electric motor is disclosed in Japanese Patent Laid-Open Publication No. 4-164132.

In the turbocharger with an electric motor disclosed in Japanese Patent Laid-Open Publication No. 4-164132, an amount of assist performed by the electric motor (i.e., an amount of electric power to be supplied) is decided based on a difference between a target supercharging pressure and an actual supercharging pressure. However, when a high-power is needed immediately such as rapid acceleration time, control is performed based on the target supercharging pressure and the actual supercharging pressure, and the supercharging pressure is brought close to the required supercharging pressure according to the feedback of the control. Therefore, a time lag is caused before an effect of the assist by the electric motor is obtained. Accordingly, it has been desired that the responsiveness during rapid acceleration or the like be improved.

SUMMARY OF THE INVENTION

In the light of the above-mentioned circumstances, there are provided a control device for a turbocharger with an electric motor and control method of same, which excel in responsiveness.

According to an aspect of the invention, there is provided a control device for a turbocharger with an electric motor including a turbocharger which is provided along with an internal combustion engine and supercharges air taken in the internal combustion engine using a compressor; an electric motor which can increase a supercharging pressure by running the compressor of the turbocharger; and a controller. The controller calculates a base amount of electric power to be supplied to the electric motor based on a target supercharging pressure and an actual supercharging pressure, decides an amount of electric power to be supplied to the electric motor, controls the electric motor based on the decided amount of electric power to be supplied, and sets the amount of electric power to be supplied to a maximum amount of electric power in a beginning state of an electric power supply to the electric motor regardless of the calculated base amount of electric power.

According to another aspect of the invention, there is provided a control device for a turbocharger with an electric motor including a turbocharger which is provided along with an internal combustion engine and supercharges air taken in the internal combustion engine using a compressor; an electric motor which can increase a supercharging pressure by running the compressor of the turbocharger; and a controller. The controller detects an output power required of the internal combustion engine, calculates a base amount of electric power to be supplied to the electric motor based on a target supercharging pressure and an actual supercharging pressure, decides an amount of electric power to be supplied to the electric motor, controls the electric motor based on the decided amount of electric power to be supplied, and sets the amount of electric power to be supplied to a maximum amount of electric power in a state where the detected value is equal to or higher than a predetermined value regardless of the calculated base amount of electric power.

According to a further aspect of the invention, there is provided a control method of a control device for a turbocharger with an electric motor including a turbocharger which is provided along with an internal combustion engine and supercharges air taken in the internal combustion engine using a compressor; and an electric motor which can increase a supercharging pressure by running the compressor of the turbocharger. The control method includes the following steps of calculating a base amount of electric power to be supplied to the electric motor based on a target supercharging pressure and an actual supercharging pressure; deciding an amount of electric power to be supplied to the electric motor; controlling the electric motor based on the decided amount of electric power to be supplied; and setting the amount of electric power to be supplied to a maximum amount of electric power in a beginning state of an electric power supply to the electric motor regardless of the calculated base amount of electric power.

According to a further aspect of the invention, there is provided a control method of a control device for a turbocharger with an electric motor including a turbocharger which is provided along with an internal combustion engine and supercharges air taken in the internal combustion engine using a compressor; and an electric motor which can increase a supercharging pressure by running the compressor of the turbocharger. The control method includes the following steps of detecting an output power required of the internal combustion engine; calculating a base amount of electric power to be supplied to the electric motor based on a target supercharging pressure and an actual supercharging pressure; deciding an amount of electric power to be supplied to the electric motor; controlling the electric motor based on the decided amount of electric power to be supplied; and setting the amount of electric power to be supplied to a maximum amount of electric power in a state where the detected value is equal to or higher than a predetermined value regardless of the calculated base amount of electric power.

According to the control device for a turbocharger with an electric motor and the control method of same, when high supercharging responsiveness by the turbocharger is required, for example in a beginning state of an electric power supply to the electric motor or in a state where the detected value is equal to or higher than a predetermined value, the amount of electric power to be supplied is set to the maximum amount of electric power, and the maximum amount of electric power is supplied, regardless of the calculated base amount of electric power. Accordingly, it is possible to enhance the responsiveness of rising of a supercharging pressure when the assist of the supercharging is being performed by the electric motor.

BRIEF DESCRIPTION OF THE DRAWINGS

The above-mentioned embodiment and other embodiments, objects, features, advantages, technical and industrial significance of this invention will be better understood by reading the following detailed description of the exemplary embodiments of the invention, when considered in connection with the accompanying drawings, in which:

FIGS. 2A and 2B are flowcharts for supercharging pressure (an electric motor) control according to an embodiment of the control device of the invention.

DETAILED DESCRIPTION OF THE EXEMPLARY EMBODIMENTS

Figure 1:
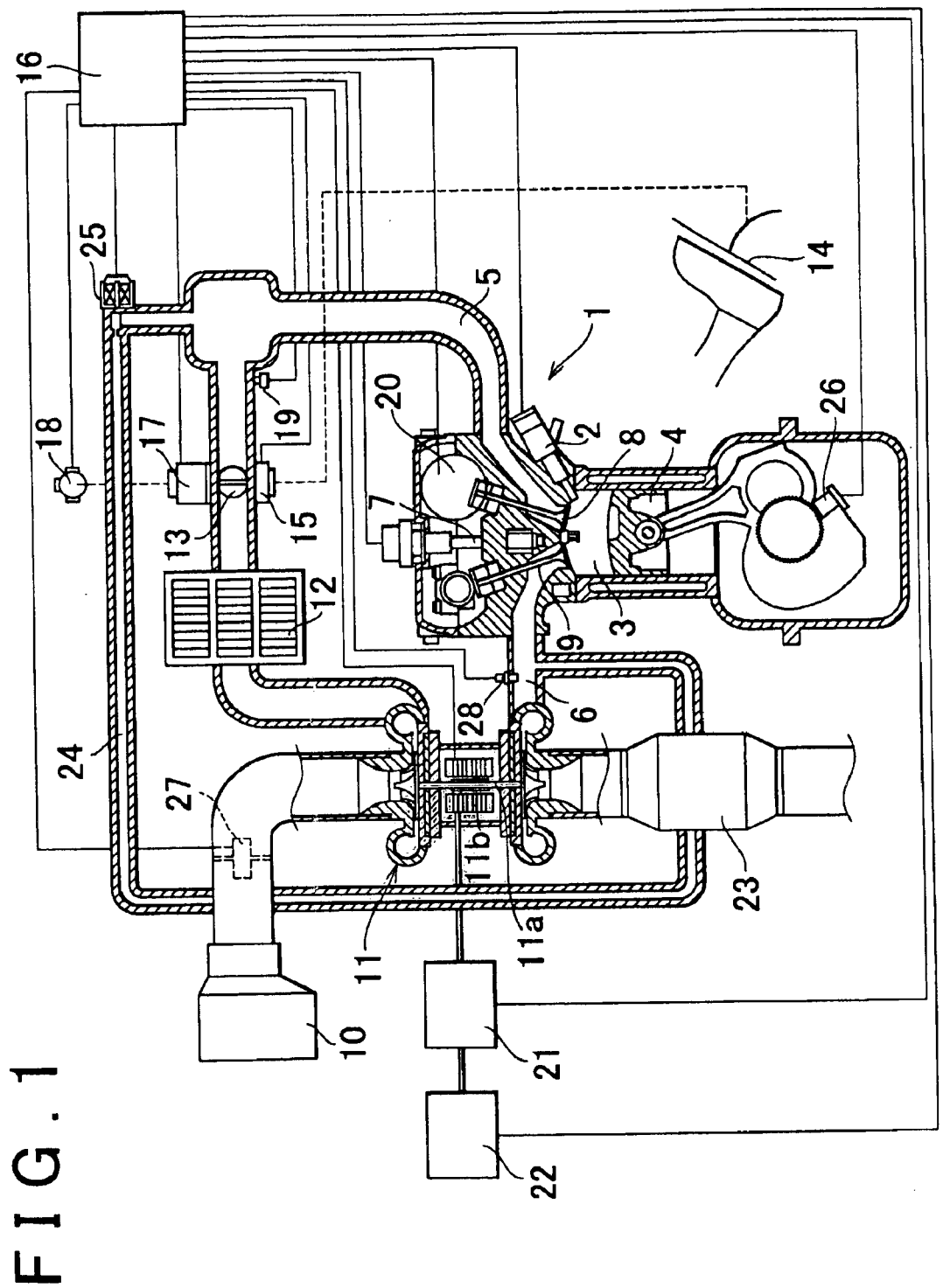
FIG. 1 is a view showing a configuration of an internal combustion engine (i.e., an engine) including an embodiment of a control device according to the invention.

In the following description and the accompanying drawings, the present invention will be described in more detail in terms of exemplary embodiments. Hereafter, an embodiment of a supercharging pressure control device according to the invention will be described with reference to accompanying drawings. FIG. 1 shows an engine 1 including the supercharging pressure control device according to the embodiment.

The engine 1 according to the embodiment is a multi-cylinder engine. Only one cylinder among the cylinders is shown in section in FIG. 1. In the engine 1, fuel is injected onto a top surface of a piston 4 in a cylinder 3 by an injector 2. In the engine 1, stratified combustion can be performed. The engine 1 is a so-called lean burn engine. By supercharging more intake air using a later-mentioned turbocharger and performing lean burn, it is possible to obtain not only high-power but also high fuel efficiency.

In the engine 1, air taken in the cylinder 3 through an intake passage 5 is compressed by the piston 4, fuel is injected into a recessed portion formed on the top surface of the piston 4, and a rich air-fuel mixture is accumulated in the vicinity of a spark plug 7 and is ignited by the spark plug 7 so as to be burned (i.e., stratified combustion is performed). When fuel injection is performed during an intake stroke, normal homogeneous combustion can be performed. An intake valve 8 permits/interrupts communication between the inside of the cylinder 3 and the intake passage 5. The exhaust gas generated due to combustion is released to an exhaust passage 6. An exhaust valve 9 permits/interrupts communication between the inside of the cylinder 3 and the exhaust passage 6. An air cleaner 10, an air flow meter 27, a turbo unit 11, an intercooler 12, a throttle valve 13, and the like are provided on the intake passage 5 from the upstream side.

The air cleaner 10 is a filter for removing dirt and dust in the intake air. The air flow meter 27 in the embodiment is a hot wire type, and detects an intake air amount as a mass flow. The turbo unit 11 is provided between the intake passage 5 and the exhaust passage 6, and performs supercharging. In the turbo unit 11 in the embodiment, a turbine side impeller and a compressor side impeller are connected via a rotating shaft (hereinafter, this portion is simply referrer to as a "turbine/compressor 11a").

The turbocharger in the embodiment is a turbocharger with an electric motor, in which an electric motor 11b is embedded such that the rotating shaft of the turbine/compressor 11a serves as an output shaft. The electric motor 11b can function as an electric generator which performs power generation using exhaust energy. The turbo unit 11 can function as a normal supercharger which performs supercharging using only exhaust energy. In addition, the turbo unit 11 can perform further supercharging by forcibly driving the turbine/compressor 11a using the electric motor 11b.

Also, it is possible to perform regenerative power generation by running the electric motor via the turbine/compressor 11a using the exhaust energy and to recover the generated electric power. The electric motor 11b is mainly provided with a rotor which is fixed to the rotating shaft of the turbine/compressor 11a and a stator which is provided on a periphery of the rotor. In the downstream side of the turbo unit 11 on the intake passage 5, there is provided the air-cooled type intercooler 12 which decreases a temperature of the intake air. Here, the temperature has been increased in accordance with an increase in the pressure due to supercharging by the turbo unit 11. The temperature of the intake air is decreased by the intercooler 12, and charging efficiency is enhanced.

In the downstream side of the intercooler 12, there is provided the throttle valve 13 which adjusts the intake air amount. The throttle valve 13 in the embodiment is a co-called electronically controlled type throttle valve. An operation amount of an accelerator pedal 14 is detected by an accelerator positioning sensor 15, and an ECU 16 decides an opening of the throttle valve 13 based on the detection result and another information. The throttle valve 13 is opened/closed by a throttle motor 17 provided along with the throttle valve 13. Also, a throttle positioning sensor 18 which detects an opening of the throttle valve 13 is provided along with the throttle valve 13.

In the downstream side of the throttle valve 13, there is provided a pressure sensor 19 which detects a pressure (i.e., a supercharging pressure/an intake air pressure) in the intake passage 5. The sensors 15, 18, 19, 27 are connected to the ECU 16, and transmit the detection results to the ECU 16. The ECU 16 is an electronic control unit which is mainly provided with a CPU, ROM, RAM and the like. The injector 2, the spark plug 7, the electric motor 11b and the like are connected to the ECU 16, and are controlled according to signals from the ECU 16. In addition, a variable valve timing mechanism 20 which controls opening/closing timing of the intake valve 8, a controller 21 which is connected to the electric motor 11b, a battery 22 and the like are connected to the ECU 16.

The controller 21 has a function as an inverter which changes voltage of the electric power obtained due to regenerative power generation by the electric motor 11b, in addition to a function of controlling the driving of the electric motor 11b. The electric power obtained due to the regenerative power generation is supplied to the battery 22 after the voltage is changed by the controller 21. Meanwhile, an air-fuel ratio sensor 28 for detecting an air-fuel ratio in the exhaust gas is provided on the exhaust passage 6 in the upstream side of the turbo unit 11. The air-fuel ratio sensor 28 is connected to the ECU 16, and transmits the detection result to the ECU 16.

An exhaust gas purifying catalyst 23 for purifying the exhaust gas is provided in the downstream side of the turbo unit 11. There is provided an EGR (i.e., exhaust gas recirculation) passage 24 for recirculating the exhaust gas from the exhaust passage 6 (i.e., the upstream side of the air-fuel ratio sensor 28) to the intake passage 5 (i.e., a surge tank portion formed in the downstream side of a pressure sensor 19). An EGR valve 25 for adjusting the amount of the exhaust gas recirculation is provided on the EGR passage 24. The opening of the EGR valve 25 is controlled by the ECU 16. A crank positioning sensor 26 for detecting a rotational position of the crankshaft is provided in the vicinity of the crankshaft of the engine 1. The crank positioning sensor 26 can detect an engine speed based on the position of the crank.

Hereafter, supercharging pressure control in the above-mentioned internal combustion engine will be described. In the supercharging pressure control according to the embodiment, initially, the output power required based on an operation state of the vehicle is estimated, and a target supercharging pressure is decided. Then, an actual supercharging pressure is detected, and an amount of electric power to be supplied to the electric motor 11b (i.e., a base amount of electric power) is decided based on a difference between the target supercharging pressure and the actual supercharging pressure. Then, the electric motor 11b is controlled based on the decided amount of electric power, and supercharging is assisted. This is the basic control according to the embodiment. Since the electric motor 11b in the embodiment is a current control type, the electric motor 11b is controlled using a current value as the amount of electric power. The electric motor 11 may be controlled using a voltage value as the amount of electric power, or using a frequency of an AC power supply, depending on types of the electric motors.

As mentioned above, when the target supercharging pressure is calculated, and the amount of electric power to be supplied to the electric motor 11b is decided based on the difference between the target supercharging pressure and the actual supercharging pressure, the rising of supercharging is delayed, and an operating feeling is bad. Particularly, during rapid acceleration or the like, not only the operating feeling is bad but also the output is slightly delayed, which reduces user-friendliness. Therefore, in order to improve the rising of the supercharging pressure, in the embodiment, when supercharging is being performed by driving the electric motor 11b, a decision is made such that the maximum amount of electric power is supplied to the electric motor 11b in the beginning of the electric power supply.

When the supply of the maximum amount of electric power is stopped, the amount of electric power is gradually decreased such that the amount of electric power is smoothly switched from the maximum amount of electric power to the base amount of electric power. In this case, the target supercharging pressure is calculated based on the detection results of the crank positioning sensor 26 which detects the engine speed, the accelerator positioning sensor 15 which detects an depressing amount of the accelerator pedal 14, and the like. The detection of the actual supercharging pressure is performed by the pressure sensor 19. In addition, the calculation of the base amount of electric power based on the target supercharging pressure and the actual supercharging pressure is performed by the ECU 16. "Namely, the sensors, the ECU 16 and the like function as the base electric power amount calculating means."

Figure 2B:
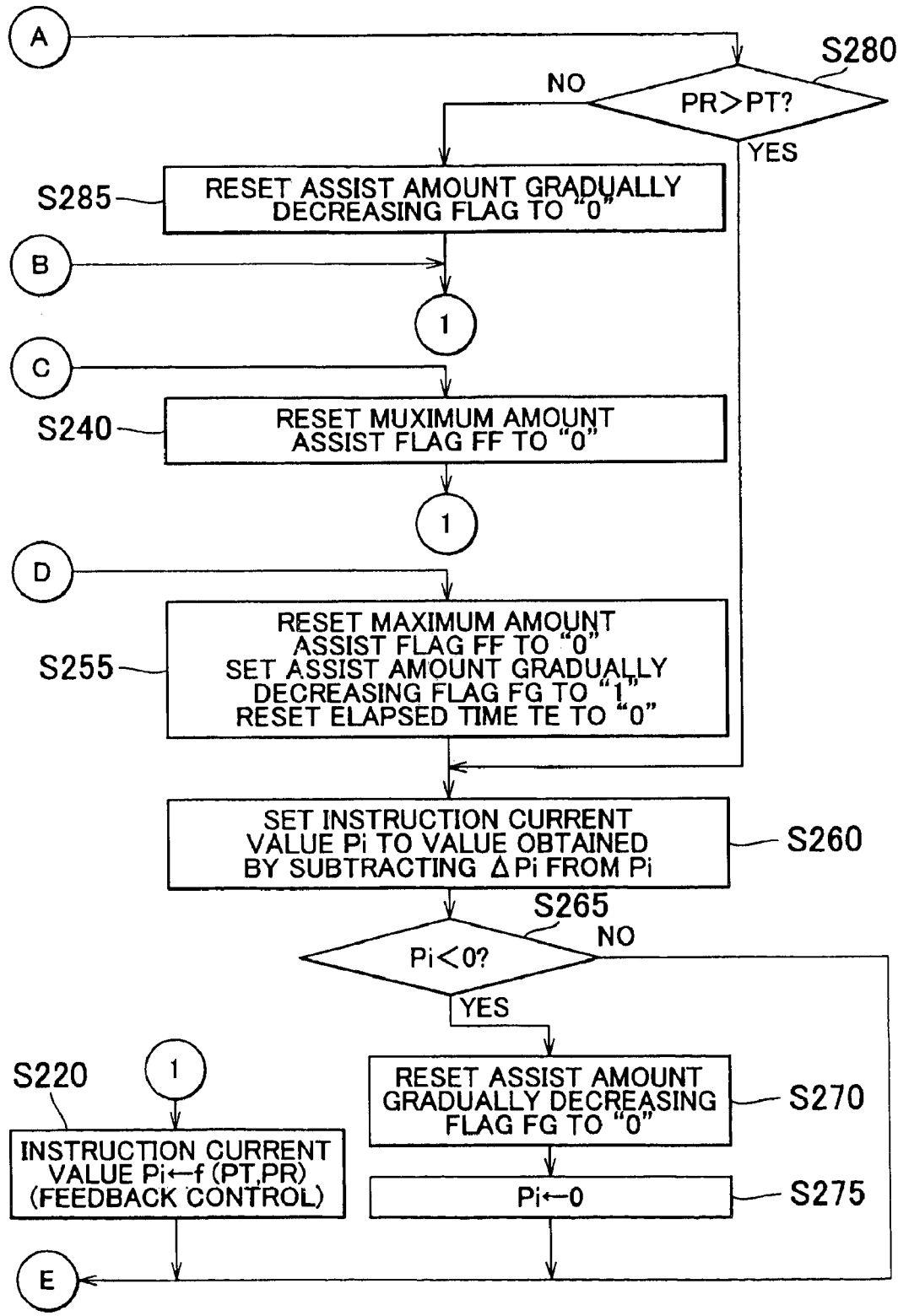

Also, the amount of electric power to be supplied to the electric motor 11b is finally decided by the ECU 16. "Namely, the ECU 16 functions as the electric power amount setting means." In addition, the ECU 16 and the controller 21 control the driving of the electric motor 11b. "The ECU 16 and the controller 21 function as the electric motor controlling means." FIGS. 2A and 2B show flowcharts for controlling the electric motor (i.e., controlling the supercharging pressure) in the embodiment. A method for deciding the amount of electric power will be described with reference to the flowcharts in FIGS. 2A and 2B.

First, the engine speed is detected by the crank positioning sensor 26 and an engine load is estimated based on the intake air amount and the throttle opening (detected by the throttle positioning sensor 18). The intake air amount is measured by the air flow meter 27, or estimated based on the detection result of the pressure sensor 19. The throttle opening is detected by the throttle positioning sensor 18. A target supercharging pressure PT is calculated based on the engine speed and the engine load (step S200). Simultaneously, an actual supercharging pressure PR is detected by the pressure sensor 19 (step S200).

Next, it is determined whether an assist amount gradually decreasing flag FG is set to "1" (step S205). The assist amount gradually decreasing flag FG shows whether the amount of electric power needs to be gradually decreased when the assist of the supercharging by the electric motor 11b is stopped. When the assist amount gradually flag is set to "0", the amount of electric power is not gradually decreased, and when the assist amount gradually flag is set to "1", the amount of electric power is gradually decreased. An initial value of the assist amount gradually decreasing flag FG is set to "0". When the flowchart in FIG. 2A is performed for the first time, a negative determination is made in step S205, and the process proceeds to step S210. The case where the assist amount gradually decreasing flag FG is set to "1" will be described later.

Next, it is determined whether a maximum amount assist flag FF is set to "1" (step S210). The maximum assist flag FF shows whether the control, for setting the amount of the assist of the supercharging by the electric motor 11b to the maximum amount, is being performed, that is, whether the amount of electric power is being increased to the maximum amount of electric power. When the maximum assist flag FF is set to "1", the maximum amount of assist is being performed. When the maximum assist flag FF is set to "0", the maximum amount of assist is not being performed. The initial value of the maximum amount assist flag is also "0". When the flowchart in FIG. 2A is performed for the first time, a negative determination is made in step S210, and the process proceeds to step S215. The case where the maximum amount assist flag FF is set to "1" will be described later.

When both the assist amount gradually decreasing flag FG and the maximum amount assist flag FF are set to "0", it is determined whether the electric motor 11b is driven using the maximum amount of electric power, that is, whether the maximum amount assist condition is satisfied (step S215). When the maximum amount assist condition is satisfied, the electric motor 11b is driven using the maximum amount of electric power. The maximum amount assist condition is satisfied when all of the following conditions are satisfied.
1) An accelerator opening change amount (detected by the accelerator positioning sensor 15) is equal to or larger than a predetermined value. When the accelerator opening change amount is equal to or larger than the predetermined value, it can be determined that the accelerator is depressed and a further power output is required.

2) A voltage of the battery 22 (detected by the controller 21) is equal to or larger than a predetermined value. In order to drive the electric motor 11b, sufficient electric energy needs to be stored in the battery.

3) A temperature of the electric motor 11b (detected by a temperature sensor (not shown) embedded in the electric motor 11b) is equal to or lower than a predetermined value. It is necessary to confirm the electric motor 11b is not overheated when the maximum amount of electric power is supplied.

4) The compressor is out of a region where a surge occurs. It is necessary to confirm that a surge does not occur when the supercharging is assisted by supplying the maximum amount of electric power and driving the electric motor 11b. It is determined whether the compressor is out of the region where a surge occurs based on the engine speed and the actual supercharging pressure PR. A map for determining whether the compressor is out of the region where a surge occurs is made in advance and stored in the controller 21 or the ECU 16.

When a negative determination is made in step S215, that is, when it is not necessary to drive the electric motor 11b using the maximum amount of electric power, normal electric motor control is performed (step S220). Namely, the amount of electric power to be supplied to the electric motor 11b (i.e., the base amount of electric power) is calculated/decided based on a difference between the target supercharging pressure PT and the actual supercharging pressure PR which are obtained in step S200, and electric power is supplied to the electric motor 11b by the ECU 16 and the controller 21 based on the decided amount of electric power (step S225).

When an affirmative determination is made in step S215, the maximum amount assist flag FF is set to "1" such that the maximum amount of electric power is supplied to the electric motor 11b and the supercharging is assisted, and a maximum amount assist time TF is calculated (step S230). Simultaneously, measurement of a time TE which has elapsed since the maximum amount assist flag FF is switched from "0" to "1" is started (step S230). The maximum amount assist time TF is a time for applying the maximum amount of electric power to the electric motor 11b. The time may be fixed, or may be variable depending on the difference between the target supercharging pressure PT and the actual supercharging pressure PR.

After step S230 is performed, it is determined whether the elapsed time TE is equal to or longer than the maximum amount assist time TF (step S235). When the process proceeds to step 235 via step S230, since the measurement of the elapsed time TE has just started, a negative determination is reliably made in step S235. Meanwhile, as described later, in the case where the control for supplying the maximum amount of electric power to the electric motor 11b has already been started, when an affirmative determination is made in step S210 and the process then proceeds to step S235, an affirmative determination may be made in step S235. When an affirmative determination is made in step S235, since the time for supplying the maximum amount of electric power to the electric motor 11b has elapsed, the maximum amount assist flag FF is returned to "0" in order to terminate the control for supplying the maximum amount of electric power (step S240), afterwhich the normal control based on the base amount of electric power is performed (steps S220, S225).

On the other hand, when a negative determination is made in step S235, since the control for supplying the maximum amount of electric power to the electric motor 11b is being performed, the amount of electric power to be supplied to the electric motor 11b (i.e., the instruction current value Pi) is set to the maximum amount of electric power (i.e., the maximum current value iMAX) (step S245). Next, it is determined whether the actual supercharging pressure PR exceeds the target supercharging pressure PT (step S250). In the case where the actual supercharging pressure PR exceeds the target supercharging pressure PT while the maximum amount of electric power is being supplied to the electric motor 11b, even when the elapsed time TE has not exceeded the maximum amount assist time TF, power supply to the electric motor 11b in the maximum amount should be stopped.

In this case, when the amount of electric power is abruptly changed, the supercharging pressure changes abruptly, and a shock occurs, which gives the driver uncomfortable feeling. Also, when the supercharging pressure changes abruptly, loads are applied to the turbine/compressor and the like. Accordingly, in this case, the problems are prevented by gradually decreasing the amount of electric power. Namely, when a negative determination is made in step S250 (i.e., when the actual supercharging pressure PR is equal to or smaller than the target supercharging pressure PT), the maximum electric power is applied to the electric motor 11b (step S225). On the other hand, when an affirmative determination is made in step S250 (i.e., when the actual supercharging pressure PR exceeds the target supercharging pressure PT), the maximum amount assist flag FF is reset to "0" and the assist amount gradually decreasing flag FG is set to "1" in order to gradually reduce the amount of electric power (step S255). Also, the elapsed time TE is reset to "0" (step S255).

After step S255 is performed, a new amount of electric power to be supplied to the electric motor 11b (i.e., an instruction current value Pi) is set to a value which is obtained by subtracting one time decreasing amount ΔPi from the present amount of electric power (i.e., the instruction current value Pi) (step S260). When the process proceeds to step S260 via step S255, the present amount of electric power (i.e., the instruction current value Pi) is the maximum amount of electric power (i.e., the maximum current value iMAX). As described later, when the process proceeds to step S260 via step S280, the gradual decrease of the amount of electric power has been already started, and the present amount of electric power (i.e., the instruction current value Pi) is smaller than the maximum amount of electric power (i.e., the maximum current value iMAX).

After step S260 is performed, a lower limit of the instruction current value Pi is guarded. More particularly, it is determined whether the instruction current value Pi is a negative value (step S265). When a negative determination is made in step S265, and the instruction current value Pi is "0" or a positive value, the instruction current value Pi is supplied to the electric motor 11b based on the value (step S225). When an affirmative determination is made in step S265, the instruction current value Pi is a negative value. In this case, the assist amount gradually decreasing flag FG is reset to "0" since the gradual decrease of the amount of electric power has been completed (step S270), afterwhich the instruction current value Pi is set to "0" (step S275). When the instruction current value of "0" is supplied to the electric motor 11b (step S225), the assist of the supercharging is not performed by driving the electric motor 11b.

After step S225 is performed, the process temporarily ends. However, the process is started from sidestep S200, and the target supercharging pressure PT and the actual supercharging pressure PR are updated. When the control for gradually decreasing the amount of electric power is continued, an affirmative determination is made in step S205. In this case, it is initially determined whether the actual supercharging pressure PR exceeds the target supercharging pressure PT (step S280). When a negative determination is made in step S280, that is, when the actual supercharging pressure PR become equal to or smaller than the target supercharging pressure PT while the control for gradually decreasing the amount of electric power is being performed, the assist amount gradually decreasing flag FG is reset to "0" in order to terminate the control for gradually decreasing the amount of electric power (step S285), after-which the normal control based on the base amount of electric power is performed (steps S220, 225).

On the other hand, when an affirmative determination is made in step S280, that is, when the actual supercharging pressure PR continues exceeding the target supercharging pressure PT, the process proceeds to step S260 in order to continue the control for gradually decreasing the amount of electric power. Step S260 and the following steps are as described above. When the electric motor 11b is driven in the above-mentioned manner, the maximum amount of electric power is reliably supplied in the beginning of the electric power supply. Namely, when an affirmative determination is made in step S215, the assist of the supercharging is being performed by driving the electric motor 11b. In this case, the assist of the supercharging is started by supplying the maximum amount of electric power. Therefore, when the assist of the supercharging is being performed using the electric motor 11b, the rising of the supercharging pressure is good, and the responsiveness is excellent.

When the actual supercharging pressure exceeds the target supercharging pressure while the assist of the supercharging is being performed by supplying the maximum amount of electric power and driving the electric motor 11b, the supply of the maximum amount of electric power is stopped. Thus, over-supercharging can be suppressed while the rising of the supercharging pressure is enhanced by supplying the maximum amount of electric power. Particularly, even when the supply of the maximum amount of electric power is stopped, a shock and loads applied to the various portions can be reduced by gradually decreasing the amount of electric power from the maximum amount of electric power. When the entire amount of electric power is interrupted at once, a wide step occurs in the output, which may give the drive uncomfortable feeling or may apply a heavy load to the turbine/compressor. However, such a problem can be prevented by gradually decreasing the amount of electric power.

In addition, when the actual supercharging pressure becomes equal to or smaller than the target supercharging pressure while the amount of electric power is being gradually decreased, the control is switched from the control for gradually decreasing the amount of electric power to the control based on the base amount of electric power. Thus, it is possible to smoothly switch the control to the normal control based on the base amount of electric power while the amount of electric power is being gradually decreased from the maximum amount of electric power. Since the control can be switched smoothly, there is no possibility that a step or the like occurs in the output and the driver feels uncomfortable. Also, the turbine/compressor and the like can be effectively prevented from being applied with a heavy load.

In the above-mentioned embodiment, as one of the maximum amount assist conditions, the condition is set that the accelerator opening change amount is equal to or larger than the predetermined value, that is, the output power required of the engine 1 is equal to or larger than the predetermined value. In the embodiment, the above-mentioned condition is set in combination with the other condition. Meanwhile, the condition may be set by itself, may be set in arbitrary combination. In this case, the output power required of the engine 1 is detected based on the accelerator opening change amount (rate) "Namely, the accelerator positioning sensor 15 functions as the required output power detecting means." The accelerator opening change amount (rate) of the throttle valve 13 may be used for detecting the required output power. "In this case, the throttle positioning sensor 18 functions as the required output power detecting means."

When the output power required of the engine 1 exceeds the predetermined value, by setting the amount of power to be supplied to the electric motor 11b to the maximum amount of electric power, it is possible to enhance the rising of the supercharging pressure when a larger output power is required. As a result, it is possible to perform turbocharger control which excels in the responsiveness. As the embodiment, it is possible to simultaneously set the amount of electric power to the maximum amount of electric power in the beginning of the electric power supply to the electric motor 11b, and set the amount of electric power to the maximum amount of electric power when the required output power is equal to or larger than the predetermined value. However, it is also possible to perform setting of the amount of electric power to the maximum amount of electric power in the beginning of the electric power supply to the electric motor 11b, and setting of the amount of electric power to the maximum amount of electric power when the required output power is equal to or larger than the predetermined value, independently of each other.

In the above-mentioned embodiment, the pressure sensor 19 and the air flow meter 27 are used in combination. However, as long as a system for estimating the intake air amount based on the internal pressure of the intake pipe can be constructed, it is not necessary to provide the air flow meter 27. The output power required of the engine 1 may be detected based on another information (e.g., the intake air amount, the engine speed).

According to the control device for a turbocharger with an electric motor of the invention, it is possible to enhance the responsiveness of the rising of the supercharging pressure while the assist of the supercharging is being performed using the electric motor.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control method of a control device for a turbocharger with an electric motor including a turbocharger which is provided along with an internal combustion engine and supercharges air taken in the internal combustion engine using a compressor; and an electric motor which increases a supercharging pressure based on an amount of electric power to be supplied to the electric motor by running the compressor of the turbocharger, comprising:

calculating a base amount of electric power to be supplied to the electric motor based on a target supercharging pressure and an actual supercharging pressure;

deciding an amount of electric power to be supplied to the electric motor;

controlling the electric motor based on the decided amount of electric power to be supplied; and setting the amount of electric power to be supplied to a maximum amount of electric power in a beginning state of an electric power supply to the electric motor and in a state where a battery voltage is equal to or larger than a predetermined value or a temperature of the electric motor is equal to or lower than a predetermined value.

2. The control method according to claim 1, further comprising:

stopping making the amount of electric power to be supplied the maximum amount of electric power, when the actual supercharging pressure exceeds the target supercharging pressure after the maximum amount of electric power is supplied to the electric motor.

3. The control method according to claim 2, further comprising:

stopping making the amount of electric power to be supplied the maximum amount of electric power, and then, as the amount of electric power gradually falls from the maximum amount, progressively making that gradually decreasing amount of electric power the amount of electric power to be supplied.

4. The control method according to claim 3, further comprising:

setting the amount of electric power to be supplied to the base amount of electric power, when the actual supercharging pressure becomes equal to or lower than the target supercharging pressure while the amount of electric power is being gradually decreased.

5. A control method of a control device for a turbocharger with an electric motor including a turbocharger which is provided along with an internal combustion engine and supercharges air taken in the internal combustion engine using a compressor; and an electric motor which increases a supercharging pressure based on an amount of electric power to be supplied to the electric motor by running the compressor of the turbocharger, comprising:

detecting an output power required of the internal combustion engine;

calculating a base amount of electric power to be supplied to the electric motor based on a target supercharging pressure and an actual supercharging pressure;

deciding an amount of electric power to be supplied to the electric motor;

controlling the electric motor based on the decided amount of electric power to be supplied; and setting the amount of electric power to be supplied to a maximum amount of electric power in a state where a detected output power required of the internal combustion engine is equal to or higher than a predetermined value and a battery voltage is equal to or larger than a predetermined value or a temperature of the electric motor is equal to or lower than a predetermined value.

6. The control method according to claim 5, wherein the detected output power includes at least an accelerator opening change amount, a battery voltage, and a temperature of the electric motor.

7. The control method according to claim 5, further comprising:

stopping making the amount of electric power to be supplied the maximum amount of electric power, when the actual supercharging pressure exceeds the target supercharging pressure after the maximum amount of electric power is supplied to the electric motor.

8. The control method according to claim 7, further comprising:

stopping making the amount of electric power to be supplied the maximum amount of electric power, and then, as the amount of electric power gradually falls from the maximum amount, progressively making that gradually decreasing amount of electric power the amount of electric power to be supplied.

9. The control method according to claim 8, further comprising:

setting the amount of electric power to be supplied to the base amount of electric power, when the actual supercharging pressure becomes equal to or lower than the target supercharging pressure while the amount of electric power is being gradually decreased.

10. A control method of a control device for a turbocharger with an electric motor including a turbocharger which is provided along with an internal combustion engine and supercharges air taken in the internal combustion engine using a compressor; and an electric motor which increases a supercharging pressure based on an amount of electric power to be supplied to the electric motor by running the compressor of the turbocharger, comprising:

detecting an output power required of the internal combustion engine;

calculating a base amount of electric power to be supplied to the electric motor based on a target supercharging pressure and an actual supercharging pressure;

deciding an amount of electric power to be supplied to the electric motor;

controlling the electric motor based on the decided amount of electric power to be supplied; and setting the amount of the electric power to be supplied to an amount of electric power larger than the base amount of electric power in a state where a detected output power required of the internal combustion engine is equal to or higher than a predetermined value and a battery voltage is equal to or larger than a predetermined value or a temperature of the electric motor is equal to or lower than a predetermined value;

the amount of electric power being set for eliminating a time lag of the turbocharger.

11. The control method according to claim 10, wherein the detected output power includes at least an accelerator opening change amount, a battery voltage, and a temperature of the electric motor.

12. The control method according to claim 10, further comprising:

stopping making the amount of electric power to be supplied the maximum amount of electric power, when the actual supercharging pressure exceeds the target supercharging pressure after the maximum amount of electric power is supplied to the electric motor.

13. The control method according to claim 10, further comprising:

stopping making the amount of electric power to be supplied the maximum amount of electric power, and then, as the amount of electric power gradually falls from the maximum amount, progressively making that gradually decreasing amount of electric power the amount of electric power to be supplied.

14. The control method according to claim 10, further comprising:

setting the amount of electric power to be supplied to the base amount of electric power, when the actual supercharging pressure becomes equal to or lower than the target supercharging pressure while the amount of electric power is being gradually decreased.

15. A control device for a turbocharger with an electric motor, comprising:

a turbocharger which is provided along with an internal combustion engine and supercharges air taken in the internal combustion engine using a compressor;

an electric motor which increases a supercharging pressure based on an amount of electric power to be supplied to the electric motor;

a controller which calculates a base amount of electric power to be supplied to the electric motor based on a target supercharging pressure and an actual supercharging pressure; decides an amount of electric power to be supplied to the electric motor; controls the electric motor based on the decided amount of electric power to be supplied; sets the amount of electric power to be supplied to an amount of electric power larger than the base amount of electric power in a state where a detected output power required of the internal combustion engine is equal to or higher than a predetermined value and a battery voltage is equal to, or larger than, a predetermined value, or a temperature of the electric motor is equal to or lower than a predetermined value, the amount of electric power being set for eliminating a time lag of the turbocharger.

16. The control device for a turbocharger with an electric motor according to claim 15, wherein the detected output power includes at least an accelerator opening change amount, a battery voltage, and a temperature of the electric motor.

17. The control device for a turbocharger with an electric motor according to claim 15, wherein the controller stops making the amount of electric power to be supplied the maximum amount of electric power, when the actual supercharging pressure exceeds the target supercharging pressure after the maximum amount of electric power is supplied to the electric motor.

18. The control device for a turbocharger with an electric motor according to claim 17, wherein the controller stops making the amount of electric power to be supplied the maximum amount of electric power, and then, as the amount of electric power gradually falls from the maximum amount, progressively makes that gradually decreasing amount of electric power the amount of electric power to be supplied.

19. The control device for a turbocharger with an electric motor according to claim 18, wherein the controller sets the amount of electric power to be supplied to the base amount of electric power, when the actual supercharging pressure becomes equal to or lower than the target supercharging pressure while the amount of electric power is being gradually decreased.

20. A control device for a turbocharger with an electric motor, comprising:

a turbocharger which is provided along with an internal combustion engine and supercharges air taken in the internal combustion engine using a compressor;

an electric motor which increases a supercharging pressure based on an amount of electric power to be supplied to the electric motor by running the compressor of the turbocharger; and a controller which calculates a base amount of electric power to be supplied to the electric motor based on a target supercharging pressure and an actual supercharging pressure; decides an amount of electric power to be supplied to the electric motor; controls the electric motor based on the decided amount of electric power to be supplied; and sets the amount of electric power to be supplied to a maximum amount of electric power in a beginning state of an electric power supply to the electric motor, and in a state where a battery voltage is equal to or larger than a predetermined value or a temperature of the electric motor is equal to or lower than a predetermined value.

21. The control device for a turbocharger with an electric motor according to claim 20, wherein the controller stops making the amount of electric power to be supplied the maximum amount of electric power, when the actual supercharging pressure exceeds the target supercharging pressure after the maximum amount of electric power is supplied to the electric motor.

22. The control device for a turbocharger with an electric motor according to claim 21, wherein the controller stops making the amount of electric power to be supplied the maximum amount of electric power, and then, as the amount of electric power gradually falls from the maximum amount, progressively makes that gradually decreasing amount of electric power the amount of power to be supplied.

23. The control device for a turbocharger with an electric motor according to claim 22, wherein the controller sets the amount of electric power to be supplied to the base amount of electric power, when the actual supercharging pressure becomes equal to or lower than the target supercharging pressure while the amount of electric power is being gradually decreased.

24. A control device for a turbocharger with an electric motor, comprising:

a turbocharger which is provided along with an internal combustion engine and supercharges air taken in the internal combustion engine using a compressor;

an electric motor which increases a supercharging pressure based on an amount of electric power to be supplied to the electric motor by running the compressor of the turbocharger; and a controller which detects an output power required of the internal combustion engine; calculates a base amount of electric power to be supplied to the electric motor based on a target supercharging pressure and an actual supercharging pressure; decides an amount of electric power to be supplied to the electric motor; controls the electric motor based on the decided amount of electric power to be supplied; and sets the amount of electric power to be supplied to a maximum amount of electric power in a state where a detected output power required of the internal combustion engine is equal to or higher than a predetermined value, and a battery voltage is equal to or larger than a predetermined value or a temperature of the electric motor is equal to or lower than a predetermined value.

25. The control device for a turbocharger with an electric motor according to claim 24, wherein the detected output power includes at least an accelerator opening change amount, a battery voltage, and a temperature of the electric motor.

26. The control device for a turbocharger with an electric motor according to claim 24, wherein the controller stops making the amount of electric power to be supplied the maximum amount of electric power, when the actual supercharging pressure exceeds the target supercharging pressure after the maximum amount of electric power is supplied to the electric motor.

27. The control device for a turbocharger with an electric motor according to claim 26, wherein the controller stops making the amount of electric power to be supplied the maximum amount of electric power, and then, as the amount of electric power gradually falls from the maximum amount, progressively makes that gradually decreasing amount of electric power the amount of electric power to be supplied.

28. The control device for a turbocharger with an electric motor according to claim 27, wherein the controller sets the amount of electric power to be supplied to the base amount of electric power, when the actual supercharging pressure becomes equal to or lower than the target supercharging pressure while the amount of electric power is being gradually decreased.

* * * * *